United States Patent Office 3,164,372
Patented Jan. 5, 1965

3,164,372
STRAP TENSIONING TOOL
Michael O. Derrickson, Norwood, Pa., assignor, by mesne assignments, to FMC Corporation, San Jose, Calif., a corporation of Delaware
Filed Dec. 21, 1962, Ser. No. 246,389
5 Claims. (Cl. 254—51)

This invention relates to strap tensioning tools and more particularly to an improved means for gripping an end portion of a strap while another part of the tool is being used to draw the strap tight. While the invention is useful with all types of flat straps, it is especially advantageous for gripping so-called cord straps.

It is an object of the invention to provide a strap tensioning tool having an improved means for holding or gripping an end of a strap firmly and without damage while the strap is drawn tight.

A further object of the invention is to provide a strap tensioning tool having an improved strap gripping means which is adjustable in a manner to efficiently grip straps having a variety of thicknesses.

Another object of the invention is to provide a strap tensioning tool having an improved strap gripping means which provides a uniform gripping action across the entire width of the strap.

Other and further objects, features and advantages of the invention will become apparent as the description of a preferred embodiment thereof proceeds.

Figure 1:
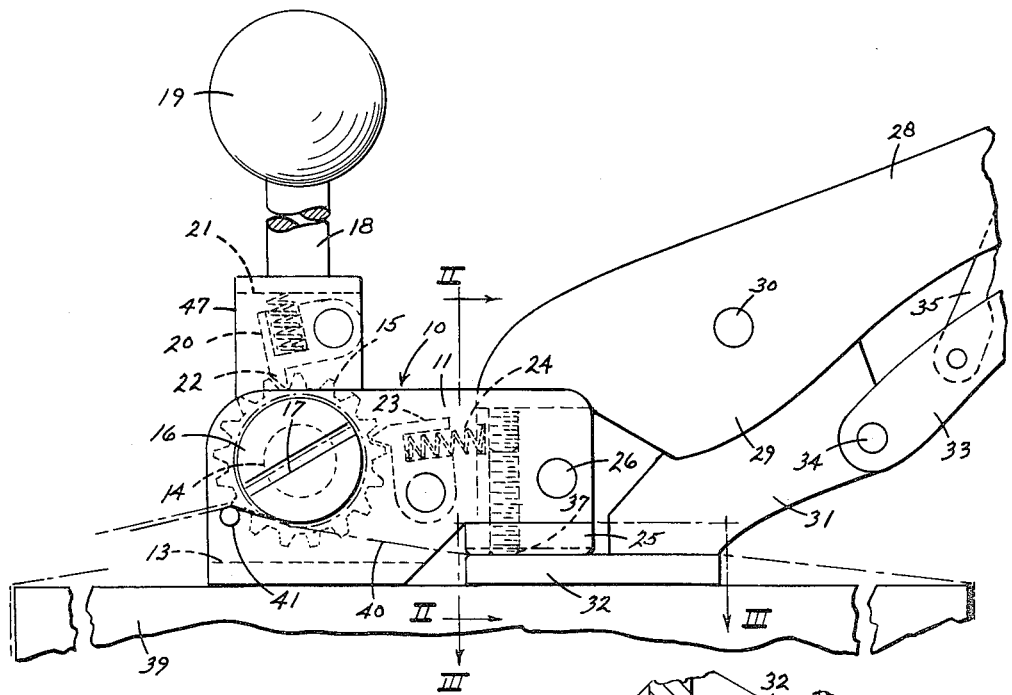
Figure 3:
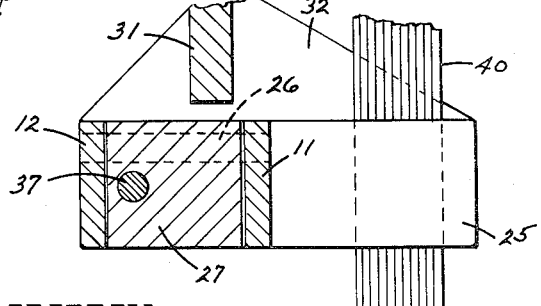
Figure 2:
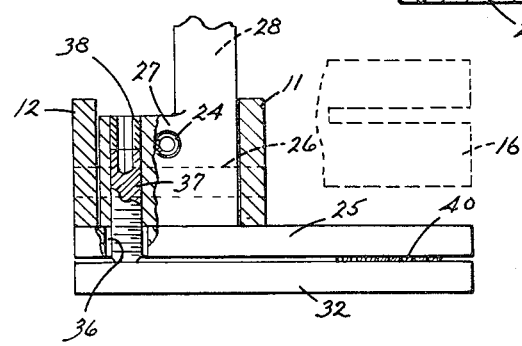

Referring now to the drawing:
FIG. 1 is a side elevational view showing the tool in use;
FIG. 2 is a section taken along the line II—II of FIG. 1; and
FIG. 3 is a section taken along the line III—III of FIG. 1.

The tool comprises a main body generally indicated at 10 formed of a pair of spaced apart plates 11 and 12 extending upwardly from a flat bottom portion 13 with which said plates may be integrally cast or to which they are rigidly connected. A shaft 14 extends between plates 11 and 12 and is rotatably mounted therein. On shaft 14 between plates 11 and 12 is secured a pinion 15 and extending outwardly from the main body is a windlass 16 which is also secured to shaft 14. Windlass 16 is provided with a transverse slot 17 to facilitate the connection of a strap to the windlass as will presently be explained. Rotatable upon shaft 14 and straddling pinion 15 is a yoke 47 extending upwardly from which is a rod 18 to the outer end of which is connected a ball 19 or other suitable handle by means of which yoke 47 may be swung back and forth through an arc about shaft 14. A pawl 20 is pivotally mounted upon yoke 47 and a compression spring 21 urges a tooth 22 of the pawl toward engagement with the teeth of pinion 15. When yoke 47 is rocked counterclockwise, pawl 20 rotates pinion 15 and the windlass 16 in a counterclockwise direction as viewed in FIG. 1. When yoke 47 is rocked clockwise the tooth of pawl 20 ratchets over the teeth of pinion 15 without causing the pinion to rotate. A holding pawl 23 is pivotally mounted between plates 11 and 12 and a compression spring 24 urges said pawl into engagement with the teeth of pinion 15 to assure that the clockwise rocking of yoke 47 does not impart rotation to the pinion and to hold the pinion against retrograde action produced by the tension in the strap. The mechanism thus far described is common in strap tensioning tools.

Plates 11 and 12 extend rearwardly beyond the bottom portion 13 of the main body and secured to the lower edges of the rearward extensions of said plates is an elongated plate member 25 which terminates at one end beneath the plate 12 and the other end of which protrudes beyond the side of plate 11. Secured in position between plates 11 and 12 by a pin 26 is a block member 27, the bottom of which is flat and seated firmly against the top of member 25. Extending from block 27 and formed integrally therewith is a member 28 which constitutes a handle for the tool. Instead of being secured in position by pin 26, the block portion 27 of the handle may be welded or otherwise suitably rigidly secured to the main body 10 of the tool.

Handle 28 and the hereinafter referred to members associated with said handle may be constructed in the manner of the wrench shown in the U.S. Patent to Peterson No. 2,280,005. Member 28 is channel-shaped and provides a pair of downwardly extending wings, one of which is indicated in FIG. 1 at 29 and between which is pivotally connected by means of a pin 30 a member 31 welded or otherwise suitably secured to a plate 32 a portion of which underlies plate 25 and which has an upper face which is parallel to the bottom face of plate 25. An operating handle or lever 33 is pivotally connected at 34 to member 31 and is articulated through a link 35 to the handle 28 so that when the operating lever 33 is squeezed toward the handle 28 plate 32 is caused to move toward plate 25. This movement of plate 32 is similar to the movement of jaw 10 of the aforesaid Peterson patent and when lever 33 is moved as far as it will go toward handle 28, the plate 32 is locked in position adjacent plate 25. As also explained in the patent, the locked position of plate 32 with respect to plate 25 may be adjusted by varying the point at which link 35 is articulated to the handle 28.

As shown in FIG. 2, plates 25 and 32 extend outwardly from the main body of the tool perpendicularly of the handle 28. In FIG. 2, windlass 16 is shown in ghost outline so as to make it apparent that the outer ends of plates 25 and 32 are aligned with said windlass. For a reason presently to be explained, an opening 36 is provided through plate 25 beneath the block 27 of handle 28 and an adjustment element or screw 37 screwed into a threaded hole in block 27 extends through the opening 36 so that the lower end of said screw contacts plate 32. If desired, a bored set screw 38 may be provided for holding screw 37 in its adjusted position.

In use, the tool is rested upon a package 39 or the like which it is desired to strap and the lever 33 is moved away from handle 28 so as to move plate 32 out of engagement with plate 25 and an end portion of the strap 40 is positioned between plates 25 and 32 and said plates are then squeezed together so as to firmly grip the strap therebetween. After passing the strap about the object, another portion thereof is engaged with slot 17 of the windlass and wrapped part way about the windlass after which said windlass is rotated in a counterclockwise direction by operation of the handle 19 as aforesaid so as to draw the strap tight about the article. If desired, a protruding pin 41 may be provided in plate 11 in proximity with the surface of windlass 16 so as to hold the overlapping strap portions away from the surface of the article. This pin facilitates the use of an open seal in securing the overlapped portions of the strap together after it has been drawn tight.

Referring now particularly to FIGS. 2 and 3, it will be seen that the strap 40 is gripped near an end portion of plates 25 and 32 so as to be properly aligned with the slot 17 of the windlass whereby the pull of the windlass is directly in line with that part of the strap engaged by the holding elements 25 and 32. However, member 31 which applies the squeezing force to gripping plate 32 is located in alignment with the main body 10 of the tool and consequently the force applied to plate 32 is out of alignment with strap 40. Disregarding for the moment the screw element 37, it will be apparent that a force applied to member 32 through the member 31 when the strap 40 is interposed between one end portion of members 25 and 32 would tend to move the gripping face of member 32 out of parallelism with the gripping face of plate 25. Thus, as seen in FIG. 2, without the screw 36, a substantial force applied to plate 32 through the member 31 would cause the left-hand end of plate 32 to contact the bottom face of plate 25 since the right-hand portion of plates 25 and 32 would be held apart by the strap 40 located therebetween. Such a cocking of plate 32 would cause that side of the strap nearest the main body 10 of the tool to be gripped firmly and the other side of the strap either gripped very lightly or not at all. As previously mentioned, the strap gripping means of the present invention is particularly adapted for use with cord strapping, an example of such strapping being shown in the patent to Karass 3,028,281. With this type of strap such an out of parallelism of the gripping plates 25 and 32 cannot be tolerated inasmuch as the full tensile strength of the strap cannot be realized unless all of the cords are securely gripped. In order to prevent the interposition of the strap between the end portions of plates 25 and 32 from causing the plate 32 to be rocked out of parallelism with plate 25 upon the application of the gripping force, screw element 37 is adjusted to protrude below the face of plate 25 and be interposed between plates 25 and 32 to the extent necessary to counterbalance the effect of the strap. With screw 37 thus adjusted, the left-hand end of plate 32, as viewed in FIG. 2, cannot move any closer to plate 25 than does the right-hand end whereby each of the cords of the strap 40 are subjected to the same pressure. By making the element 37 adjustable, the tool is readily adaptable for use with straps of different thicknesses.

Having thus described a preferred embodiment of the invention, what is claimed is:

I claim:

1. In a strap, tensioning tool adapted for use with cord strapping, a pair of relatively movable members having elongated parallel areas facing one another and adapted to engage opposite faces of a flat strap adjacent one end of the elongated areas, means for applying a strap gripping force to said members out of alignment with the end engaging the strap whereby the interposition of the strap between the members tends to cause the facing areas of the members to move out of parallelism under the action of the gripping force, and means interposed between the parallel areas of said members at a point remote from the strap to prevent the areas from being forced out of parallelism.

2. The device set forth in claim 1 wherein the last mentioned means is adjustable so as to adapt the device for use with straps of different thicknesses.

3. A strap tensioning tool comprising a main body, a handle extending from said main body, a strap tightening windlass extending outwardly from said main body perpendicularly of said handle, a first elongated strap gripping member secured to said main body and having a strap gripping portion extending outwardly from said main body in alignment with said windlass, a second elongated strap gripping member articulated to said handle, said second member having a strap gripping portion extending parallel to the strap gripping portion of said first member, means for moving said second member toward said first member to grip a strap between the strap gripping portions of said members, said means applying a force to said second member in misalignment with the strap gripping portion thereof, and an adjustably mounted element extending through said first strap gripping member to bear against a portion of said second member when the strap gripping force is applied to said second member to prevent the strap gripping portion of said second member from being forced out of parallelism with the strap gripping portion of said first member.

4. A strap tensioning tool comprising a main body, a handle extending from said main body, a strap tightening windlass journaled in said main body, said windlass extending outwardly from said main body in a direction perpendicular to said handle, a flat faced substantially rectangular plate having a first end portion secured to said main body and a second end portion extending from said main body parallel to and aligned with said windlass, a strap gripping member articulated to said handle, said member having a flat face extending parallel to the flat face of said rectangular plate and including a first portion aligned with the first end portion of said plate and a second portion aligned with the second end portion of said plate, means for moving said gripping member toward said rectangular plate in order to squeeze a strap between the second end portion of said plate and the second portion of said member, said means applying a force to the gripping member in alignment with the first end portion of said rectangular plate whereby the interposition of the strap between the gripping member and plate tends to cause the parallel faces thereof to be forced out of parallelism, and a device extending through the first end portion of said rectangular plate for bearing against the first portion of said gripping member to limit the movement of said first portion of the gripping member and thereby prevent the flat faces of said rectangular plate and said gripping member from being forced out of parallelism due to the interposition of the strap.

5. The tool set forth in claim 4 wherein said device is an adjustable screw one end of which is engaged by the flat face of the first portion of said gripping member as said gripping member is moved toward said rectangular plate.

References Cited in the file of this patent
UNITED STATES PATENTS

| | | |
|---|---|---|
| 2,156,062 | Porter | Apr. 25, 1939 |
| 2,199,744 | Gerrard | May 7, 1940 |
| 2,204,572 | Childress | June 18, 1940 |
| 2,934,318 | Schultz | Apr. 26, 1960 |